US012086225B1

(12) United States Patent
Medioni et al.

(10) Patent No.: US 12,086,225 B1
(45) Date of Patent: Sep. 10, 2024

(54) SYSTEM TO REDUCE DATA RETENTION

(71) Applicant: AMAZON TECHNOLOGIES, INC., Seattle, WA (US)

(72) Inventors: Gerard Guy Medioni, Los Angeles, CA (US); Manoj Aggarwal, Seattle, WA (US); Alon Shoshan, Haifa (IL); Igor Kviatkovsky, Haifa (IL); Nadav Israel Bhonker, Talmei Elazar (IL); Lior Zamir, Ramat Hasharon (IL); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 248 days.

(21) Appl. No.: 17/448,437

(22) Filed: Sep. 22, 2021

(51) Int. Cl.
  *G06F 21/32* (2013.01)
  *G06F 18/213* (2023.01)
  *G06F 18/214* (2023.01)
  *G06F 21/62* (2013.01)

(52) U.S. Cl.
  CPC .......... *G06F 21/32* (2013.01); *G06F 18/213* (2023.01); *G06F 18/214* (2023.01); *G06F 21/6245* (2013.01)

(58) Field of Classification Search
  CPC ...... G06F 21/32; G06F 18/213; G06F 18/214; G06F 21/6245
  See application file for complete search history.

(56) References Cited

U.S. PATENT DOCUMENTS

| | | | |
|---|---|---|---|
| 2020/0184171 A1* | 6/2020 | Lee | G06V 40/1376 |
| 2020/0184278 A1* | 6/2020 | Zadeh | G06N 3/044 |
| 2020/0302152 A1* | 9/2020 | Tagra | G06V 40/1371 |
| 2021/0216617 A1* | 7/2021 | Semba | G06T 7/00 |
| 2021/0279515 A1* | 9/2021 | Zhang | G06V 40/168 |
| 2022/0277588 A1* | 9/2022 | Zhai | G06V 40/172 |
| 2022/0327189 A1* | 10/2022 | Belli | G06F 21/552 |

OTHER PUBLICATIONS

"2.4.8 Kullback-Leibler Divergence", 2 pages. Retrieved from the Internet: URL: https://hanj.cs.illinois.edu/cs412/bk3/KL-divergence.pdf.

(Continued)

*Primary Examiner* — Huan V Doan
(74) *Attorney, Agent, or Firm* — Lindauer Law, PLLC

(57) ABSTRACT

An image of at least a portion of a user during enrollment to a biometric identification system is acquired and processed with a first model to determine a first embedding that is representative of features in that image in a first embedding space. The first embedding may be stored for later comparison to identify the user, while the image is not stored. A second model that uses a second embedding space may be later developed. A transformer is trained to accept as input an embedding from the first model and produce as output an embedding consistent with the second embedding space. The previously stored first embedding may be converted to a second embedding in a second embedding space using the transformer. As a result, new embedding models may be implemented without requiring storage of user images for later reprocessing with the new models or requiring re-enrollment by users.

18 Claims, 7 Drawing Sheets

(56) References Cited

OTHER PUBLICATIONS

"KL Divergence for Machine Learning", The RL Probablilist, 6 pages. Retrieved from the Internet: URL: https://dibyaghosh.com/blog/probability/kldivergence.html.

Chen, et al., "R3 Adversarial Network for Cross Model Face Recognition", pp. 9868-9876. Computer Vision Foundation. Retrieved from the Internet: URL: https://openaccess.thecvf.com/content_CVPR_2019/papers/Chen_R3_Adversarial_Network_for_Cross_Model_Face_Recognition_CVPR_2019_paper.pdf.

Shen, et al., "Towards Backward-Compatible Representation Learning", AWS/Amazon AI, arXiv:2003.11942v3 [cs.CV] Jan. 6, 2021, 13 pages. Retrieved from the Internet: URL: https://arxiv.org/pdf/2003.11942v3.pdf.

Wang, et al., "CosFace: Large Margin Cosine Loss for Deep Face Recognition", Tencent AI Lab, arXiv:1801.09414v2 [cs.CV] Apr. 3, 2018, 11 pages. Retrieved from the Internet: URL: https://arxiv.org/pdf/1801.09414.pdf.

Wang, et al., "Unified Representation Learning for Cross Model Compatibility", 2020, arXiv:2008.04821v1 [cs.CV] Aug. 11, 2020, 13 pages. Retrieved from the Internet: https://arxiv.org/pdf/2008.04821.pdf.

\* cited by examiner

SYSTEM TO REDUCE DATA RETENTION

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
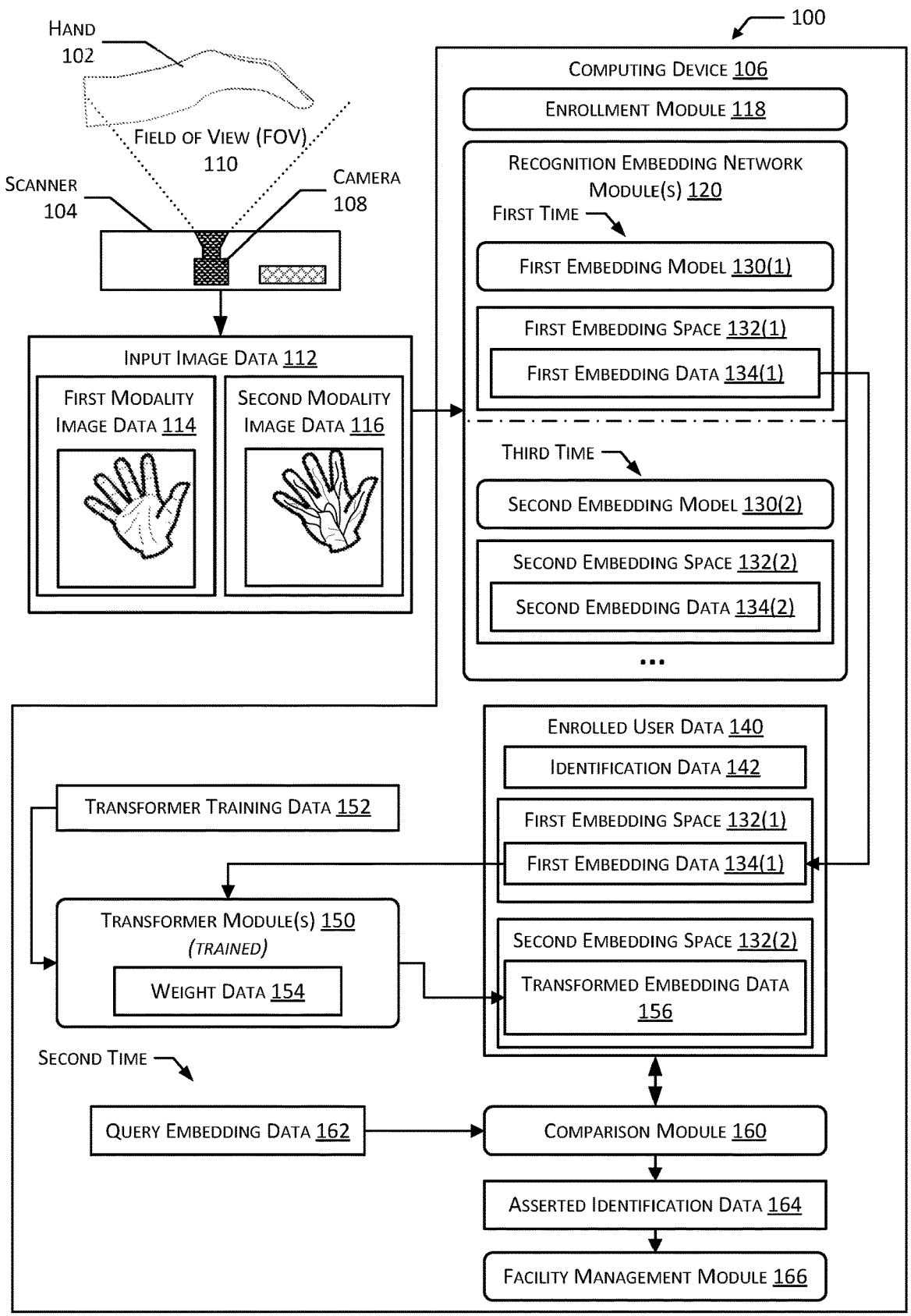
FIG. 1 illustrates a system to reduce data retention in a biometric identification system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using one or more modalities. For example, a first modality may comprise images of surface skin of a user's palm while a second modality may comprise images of subcutaneous features such as veins of the user's palm. The use of multi-modality input data provides several advantages for biometric identification.

Traditional biometric identification systems obtain input data during enrollment and store this input data as a "gallery". This gallery facilitates further development and refinement of the traditional identification system. Development may include updates to algorithms used to characterize the input data. For example, a first neural network may be trained to process an input image and generate a first embedding that comprises a vector value representative of the features depicted in that input image. Later, a second neural network may be trained to generate a second embedding that may be deemed advantageous to use going forward. In such systems, the input images in the gallery are processed with the second neural network to generate the second embeddings.

Because the gallery contains information that may be deemed to be private by users, legal entities, and so forth, the information therein must be safeguarded from impermissible access. As a result, substantial efforts are taken in an attempt to prevent disclosure of information in the gallery.

One inadequate option is to retain only the first embeddings, and not store gallery data. However, this approach requires user input if an update changes the embedding. For example, without the gallery data, to generate the second embeddings each user of the system would need to perform the enrollment process again. Such repeated efforts may annoy users, limit improvement of the identification system, substantially increase costs associated with an update, and so forth.

Described in this disclosure are techniques to reduce or eliminate altogether retention of input data for a biometric identification system. The gallery is eliminated, removing privacy and security concerns. Future updates to the biometric identification system are possible without re-enrollment by training transformer networks to convert a first embedding to a second embedding and without reducing system accuracy. These techniques may also be used to migrate information about users from one biometric identification platform to another.

The transformer networks are neural networks that are trained using training data. The training data uses a training image that is processed by a first embedding model to determine first training embedding data, representative of the training image in a first embedding space. The training image is also processed by a second embedding model to determine second training embedding data, representative of the same training image in a second embedding space. Transformer training data comprises pairs of first training embedding data and second training embedding data that are associated with the same training image. The training images themselves may be actual images obtained from individuals who have opted in to provide training data, synthetic images that are produced such as by a generative adversarial network, and so forth.

The transformer network is trained using the transformer training data and using several loss values. A transformer network module processes the first training embedding data to determine transformed embedding data. While the network is learning, this transformed embedding data may be a poor representation, but as a result of repeated iterations during training and using the loss functions described, the transformer network module learns to transform or convert the first embedding data into second embedding data. During training, for each pair of transformer training data, a first classification loss is determined based on the transformed embedding data. A second classification loss is also determined, based on the second training embedding data. A similarity loss based on the transformed embedding data and the second training embedding data is then determined. A divergence loss based on the first classification loss and the second classification loss is also determined. These loss values are then provided back to the transformer network module during training.

The trained transformer network(s) may be used in various implementations. In a first implementation, a single transformer network is used to transform first embedding data that is associated with a first embedding space into second embedding data that is associated with a second embedding space. For example, if an embedding model of a biometric identification system is updated from a first model to a second model, operation of the system may continue without a gallery or requiring re-enrollment. The "old" first embeddings are converted to the "new" second embeddings by the trained single transformer network.

In a second implementation, a plurality of different transformer networks may be used, each trained as described above. Each of these transformer networks, as a result of training, will have different weights for nodes in the respective neural networks. To perform the transform, the first embedding data is provided as input to each of the plurality of different transformer networks. Each in turn produces transformed embedding data. For example, the transformed embedding data may comprise a vector value. A set of the transformed embedding data from the plurality may be combined to produce a final transformed embedding data that is representative of the second embedding space. For example, the vector values may be averaged to produce final transformed embedding data. Colloquially, this implementation may be considered as though each transformer network has "learned" differently from other transformer networks and contributes to the final transformed embedding data.

In a third implementation, a plurality of different transformer networks are each trained for different pairwise combinations of embeddings. For example, over time the first model may be replaced with a second model, the second model replaced with a third model, and so forth. Corresponding embedding data may be available that was generated using these respective models, such as first embedding data, second embedding data, and third embedding data. A plurality of transformer networks may be used, each trained as above for a different pairwise combination of embeddings. For example, a first transformer network may be trained to transform a first embedding to a fourth embedding. A second transformer network may be trained to transform a second embedding to the fourth embedding. A third transformer network may be trained to transform a third embedding to the fourth embedding.

With this third implementation, the respective embeddings that are associated with the same identity are transformed into transformed embedding data in the fourth embedding space. As above, the transformed embedding data may comprise a vector value. A set of the transformed embedding data from the plurality may be combined to produce a final transformed embedding data that is representative of the second embedding space. For example, the vector values may be averaged to produce final transformed embedding data. Colloquially, this implementation may be considered as though each of the different embeddings for the same identity have contributed some information to the final transformed embedding data.

In other implementations, other combinations of these techniques may be used. For example, the second and third implementations may be combined.

By using the techniques described in this disclosure, a biometric identification system is able to operate and be updated without storing a gallery, such as images of a user's hands. Furthermore, by using the techniques described herein, operation without the retention of a gallery is possible with the same or greater accuracy compared to systems that maintain a gallery. This affords a substantial increase in user privacy by eliminating the possibility of inadvertent release of gallery data, while maintaining a high level of accuracy in operation of the system. For example, by using the techniques used in this disclosure user privacy is improved by not storing gallery data, while the user experience and overall system integrity is improved by maintaining subsequent highly accurate identification. This also results in a substantial decrease in data storage requirements by eliminating the need to store gallery data.

Illustrative System

FIG. 1 illustrates a system 100 to reduce data retention, according to some implementations. The system 100 is described as being used to facilitate the reduction of data retained as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In the implementation depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

Users are able to utilize the system 100 by performing an enrollment process. An enrollment module 118 may coordinate the enrollment process. Enrollment may associate biometric information, such as embedding data, with particular information such as a name, account number, and so forth.

During an enrollment process, the user opts in and presents their hand 102 to the scanner 104. The scanner 104 provides input image data 112 to a computing device 106 executing a recognition embedding network module 120. The recognition embedding network module 120 comprises a neural network implementing a model that accepts as input the input image data 112 and provides as output embedding data 134. The embedding data 134 is representative of at least some of the features depicted in the input image data 112. In some implementations the embedding data 134 may comprise a vector value in an embedding space.

In some implementations, the scanner 104 may include a computing device 106, and may execute the recognition embedding network module(s) 120. In another implementation, the scanner 104 may encrypt and send the input image data 112 or data based thereon, to another computing device 106 such as a server.

During the enrollment process, the submitted embedding data 134 may be checked to determine whether the user has been previously enrolled. A successful enrollment may comprise storage of identification data 142, such as name, telephone number, account number, and so forth and storage of the embedding data 134 as enrolled user data 140. In some implementations, the enrolled user data 140 may comprise additional information associated with processing of the input image data 112 with an embedding model 130. For example, the enrolled user data 140 may comprise intermediate layer data, such as the values of a penultimate layer of the embedding model 130.

In this illustration, at a first time, at the time of enrollment a first embedding model 130(1) is in use by the recognition embedding network modules 120. The first embedding model 130(1) has been trained to accept input image data 112, operates within a first embedding space 132(1), and generates as output first embedding data 134(1). The first embedding data 134(1) consists of a vector value that is within the first embedding space 132(1). The first embedding space 132(1) may have a first dimensionality. For example, a vector within the first embedding space 132(1) may be associated with 512 dimensions.

Continuing at the first time, the first embedding data 134(1) from our user's enrollment may then be stored as the enrolled user data 140. Also stored is identification data 142 that is associated with this first embedding data 134(1). However, it is important to note that the input image data 112 acquired during enrollment is not stored as enrolled user data 140. In other words, no "gallery" of input images is retained. In this example, at the first time, only the first embedding data 134(1) and the associated identification data 142 are stored as enrolled user data 140.

During subsequent usage, such as at a second time, the (as yet unidentified) user presents their hand 102 at a scanner 104. The resulting query input image data 112 may be processed by the first embedding model 130(1) to determine query embedding data 162 that is in the first embedding space 132(1). The comparison module 160 compares the query embedding data 162 to the first embedding data 134(1) stored in the enrolled user data 140 to determine asserted identification data 164. In one implementation, the asserted identification data 164 may comprise a user identifier associated with the closest previously stored embedding data 134 in the enrolled user data 140 to the query embedding data 162 associated with the user who presented their hand 102. The comparison module 160 may utilize other considerations, such as requiring that the query embedding data 162 is no more than a maximum distance in the embedding space from the embedding data 134 of a particular user before determining the asserted identification data 164.

The asserted identification data 164 may then be used by subsequent systems or modules. For example, the asserted identification data 164, or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the scanner 104, the user identity indicated in the identification data 142 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The system 100 may continue to undergo changes over time. In this illustration, at a third time the recognition embedding network modules 120 are updated to include a second embedding model 130(2). For example, the second embedding model 130(2) may comprise a different neural network architecture, may have used different training data, and so forth.

This second embedding model 130(2) generates second embedding data 134(2) that is within a second embedding space 132(2). The second embedding space 132(2) may differ from the first embedding space 132(1). For example, the second embedding space 132(2) may have a different number of dimensions from the first embedding space 132(1). In another example, the first embedding space 132(1) and the second embedding space 132(2) may have the same overall dimensionality, but one or more specified dimensions in the first embedding space 132(1) are not collinear with one or more specified dimensions in the second embedding space 132(2). In some implementations embedding spaces 132 may share one or more common dimensions, or may be completely disjoint.

The differences between the first embedding data 134(1) in the first embedding space 132(1) and the second embedding data 134(2) in the second embedding space 132(2) make them incompatible for direct comparison by the comparison module 160 without further processing.

With no further processing or action, for the system to continue to operate, it would be necessary to perform the enrollment process again, processing the input image data 112 with the second embedding model 130(2) in order to determine the second embedding data 134(2) for retention in the enrolled user data 140. However, this is annoying to users, time intensive, and costly. Each time an embedding model 130 is changed to utilize a different embedding space 132, such action would need to be taken. As a result, development may be stifled.

A transformer module 150 is trained using transformer training data 152 to transform or convert embedding data 134 from one embedding space 132 to another. Once trained, the transformer module 150 includes weight data 154 that is indicative of weights, bias values, or other values associated with nodes in its neural network that are representative of the resulting training. The training and operation of the transformer module 150 is discussed in more detail in the following figures.

Once trained, the transformer module(s) 150 is used to transform the first embedding data 134(1) into transformed embedding data 156 in the second embedding data 134(2). As a result, during subsequent use the second embedding model 130(2) may be used, and the comparison module 160 is able to operate by comparing query embedding data 162 in the second embedding space 132(2) with enrolled user data 140 comprising the transformed embedding data 156.

By using the system and techniques described in this disclosure, gallery data comprising input image data 112 acquired during enrollment is not retained. This improves overall privacy for the user, reduces a quantity of data that has to be securely stored, and still allows for ongoing updates to the recognition embedding network modules 120.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
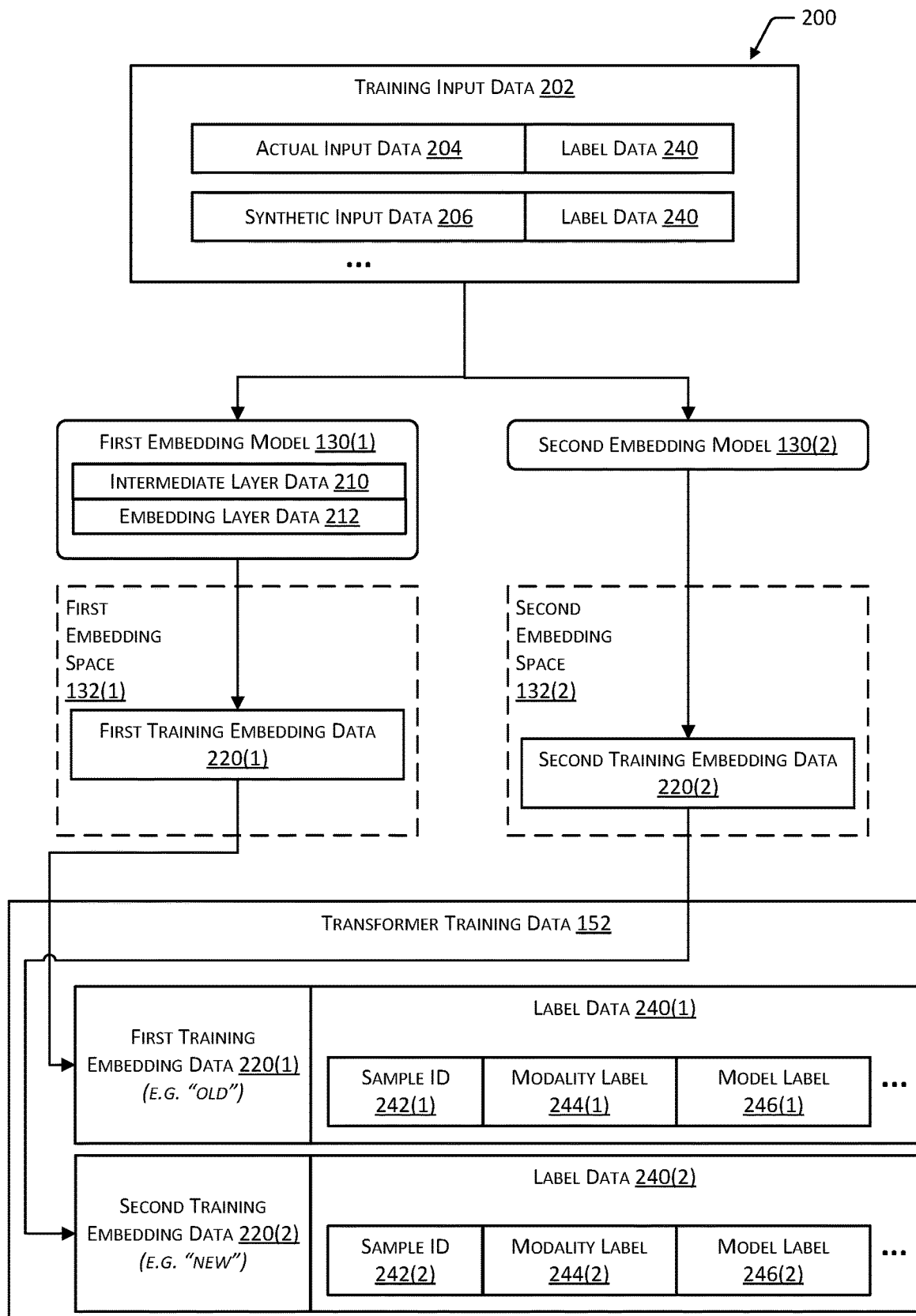
FIG. 2 illustrates processing training input data to determine transformer training data, according to some implementations.

FIG. 2 illustrates at 200 a method of processing training input data to determine transformer training data 152, according to some implementations. The preparation of transformer training data 152 may be implemented by one or more computing devices 106. Transformer training data 152 is acquired for use in training the transformer module 150, with that training expressed as the weight data 154.

Training input data 202 is shown. The training input data 202 may comprise one or more of actual input data 204 with associated label data 240 or synthetic input data 206 with associated label data 240. The actual input data 204 may comprise actual input image data 112 that has been acquired from individuals who have opted in to provide training data. In one implementation, the training input data 202 may exclude individuals who have enrolled to use of the system for identification. In another implementation, some enrolled users may opt in to explicitly permit input image data 112 obtained during enrollment to be stored as actual input data 204 for later training.

The synthetic input data 206 may comprise synthetic data that is consistent with expected input image data 112. For example, the synthetic input data 206 may comprise output from a generative adversarial network (GAN) that has been trained to produce synthetic images of a user's hand. In some implementations, the synthetic data may be based on actual input data 204. In other implementations, other techniques may be used to determine the synthetic input data 206.

The label data 240 may comprise information such as a sample identifier (ID) 242, modality label 244, model label 246, and so forth. The sample ID 242 indicates a particular training identity. The modality label 244 indicates whether the associated input data is representative of a first modality, second modality, and so forth. The model label 246, discussed later may indicate the embedding model 130 used to determine the training embedding data 220.

The training input data 202 is processed by at least two embedding models. In the following examples, the first embedding model 130(1) may be considered the "old" or "existing" embedding model 130, while the second embedding model 130(2) may be considered the "new" or "updated" embedding model 130. For these examples, the first embedding model 130(1) may be assumed to be deprecated and discontinued for use as a recognition embedding network module 120 at a future time, after which the second embedding model 130(2) will be used.

The first embedding model 130(1) is used to process input data from the training input data 202, generating first training embedding data 220(1) that is in the first embedding space 132(1). In some implementations, the first training embedding data 220(1) comprises, or is based on, intermediate layer data 210 and embedding layer data 212. The intermediate layer data 210 may comprise values associated with one or more layers of the first embedding model 130(1) while processing input. The embedding layer data 212 comprises the embedding data that is provided by output of the first embedding model 130(1). In one implementation, the intermediate layer data 210 may comprise values of a penultimate layer of a neural network of the first embedding model 130(1). The penultimate layer may comprise the layer preceding the final output of the embedding layer data 212. In one implementation, the intermediate layer data 210 may comprise the values of a fully connected linear layer that precedes the output of the embedding layer data 212. For example, the embedding layer data 212 may have a vector of size 128, while the intermediate layer data 210 has a vector of size of 1280.

Continuing the implementation discussed above, the first training embedding data 220(1) may comprise a concatenation of the intermediate layer data 210 and the embedding layer data 212. In other implementations, the intermediate layer data 210 and the embedding layer data 212 may be otherwise combined.

In some implementations, use of the intermediate layer data 210 results in a substantial improvement in overall performance of the system.

The same training input data 202 is also processed with the second embedding model 130(2), generating second training embedding data 220(2). This pair of training embedding data 220(1) and 220(2) may be associated with one another by a common value of sample ID 242. This pair is thus representative of the same input data, from the training input data 202, as expressed in two different embedding spaces 132. Each instance of training embedding data 220 may have associated label data 240. This associated label data 240 may include a model label 246 that is indicative of the embedding model 130 used to generate the particular training embedding data 220.

The transformer training data 152, comprising first training embedding data 220(1), second training embedding data 220(2), and associated or implied label data 240 may not be used to train a transformer network module 310 within a transformer module 150, as described next.

Figure 3:
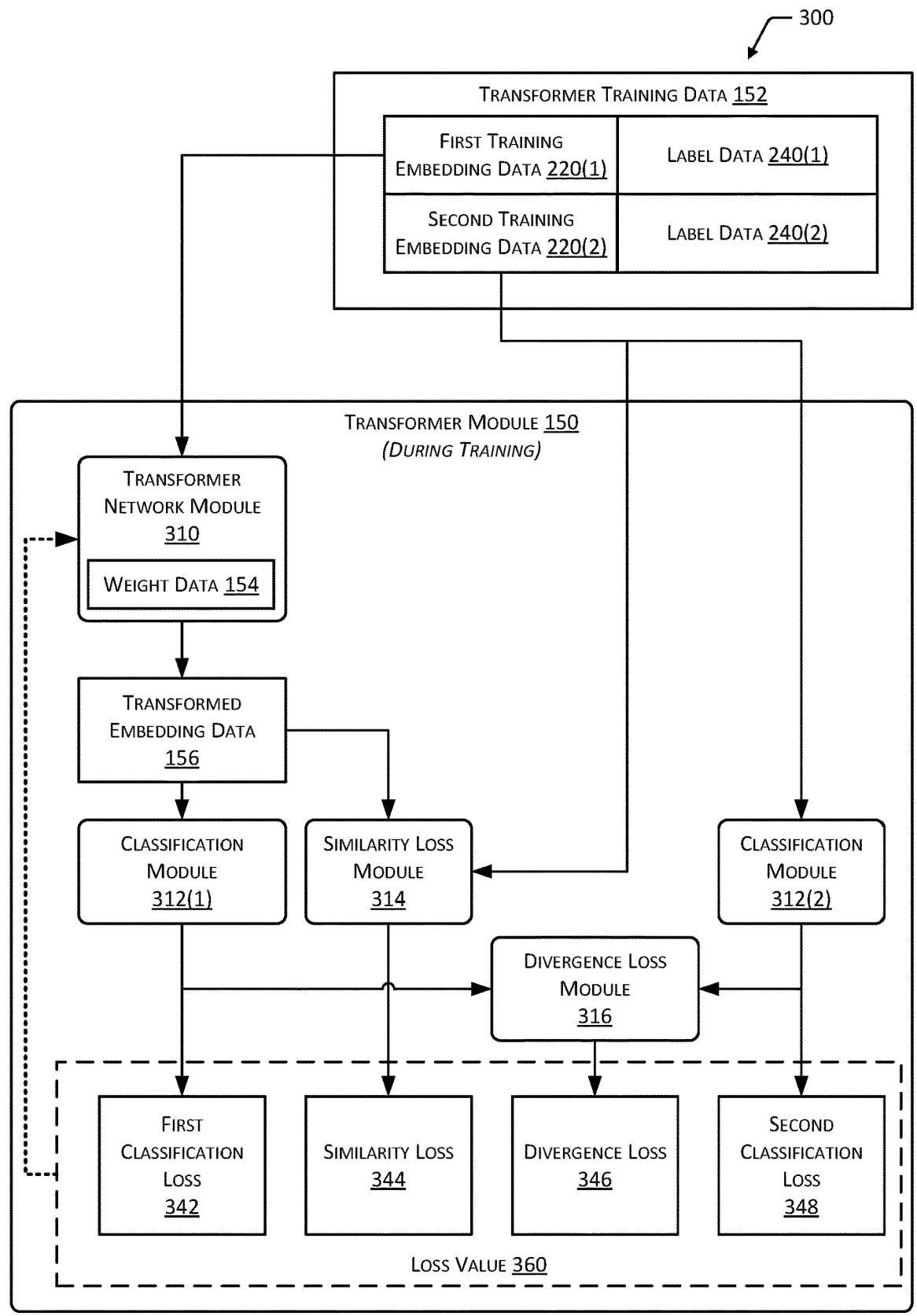
FIG. 3 illustrates a transformer module during training, according to some implementations.

FIG. 3 illustrates a transformer module 150 during training, according to some implementations. The transformer module 150 may be implemented by one or more computing devices 106. The transformer module 150 comprises a transformer network module 310, classification modules 312, similarity loss module 314, and a divergence loss module 316.

The transformer network module 310 may comprise a neural network. During training, the transformer network module 310 accepts as input first training embedding data 220(1), associated with the first embedding space 132(1), and produces as output transformed embedding data 156. As training progresses, the quality of the resulting transformed embedding data 156 may be expected to improve due to the loss values 360 that are returned as described below.

The transformed embedding data 156 is processed by a first classification module 312(1) to determine a first classification loss 342. In one implementation, the classification module 312 may utilize a HyperSpherical loss function as shown with regard to equations 1 and 2. In other implementations, other classification loss functions may be used. For example, other classification functions such as Softmax, Cosine, AM-Softmax, Arcface, large margin cosine loss, and so forth may be used.

The HyperSpherical Loss (HSL) function may also be used during training of the embedding models 130. The HSL loss minimizes L which is the sum of a cross-entropy term, and a regularization term to regularize the confidence score (weighted by $\lambda$). $W_j$ denotes a classifier weight for $j^{th}$ class. C is the total number of training classes. M is the minibatch size. In in these equations m is a fixed angular margin. $\hat{W}$ and $\hat{x}$ are the unit-normalized form of W and x respectively. Also in these equations $x_i$ (embedding vector of input I) and $s_i$ are both outputs of the embedding model 130, where $s_i$ is used only during training.

$$L = -\frac{1}{M}\sum_{i=1}^{M}\left(\log p_i - \lambda s_i^2\right) \quad (1)$$

$$p_i = \frac{e^{S_i\left(\hat{W}_{y_i}^T \hat{x}_i - m\right)}}{e^{S_i\left(\hat{W}_{y_i}^T \hat{x}_i - m\right)} + \sum_{j=1, j\neq y_i}^{C} e^{\hat{W}_j^T \hat{x}_i}} \quad (2)$$

The second training embedding data 220(2) is processed by a second classification module 312(2) to determine a second classification loss 348. The second classification module 312(2) may utilize the same loss function as the first classification module 312(1). For example, the second classification module 312(2) may utilize the HyperSpherical loss function.

The similarity loss module 314 accepts as input the transformed embedding data 156 and the second training embedding data 220(2) and determines a similarity loss 344.

In one implementation, the similarity loss module 314 may implement a mean squared error (MSE) and cosine distance loss function. In other implementations, other loss functions may be used. For example, an MSE loss may be used.

The divergence loss module 316 accepts as input the first classification loss 342 and the second classification loss 348 and determines a divergence loss 346. In one implementation, the divergence loss module 316 may implement a Kullback-Leibler divergence (KLD) function.

Loss value(s) 360 comprising one or more of the first classification loss 342, the second classification loss 348, the similarity loss 344, or the divergence loss 346 are then provided back to the transformer network module 310 for subsequent iterations during training.

Figure 4:
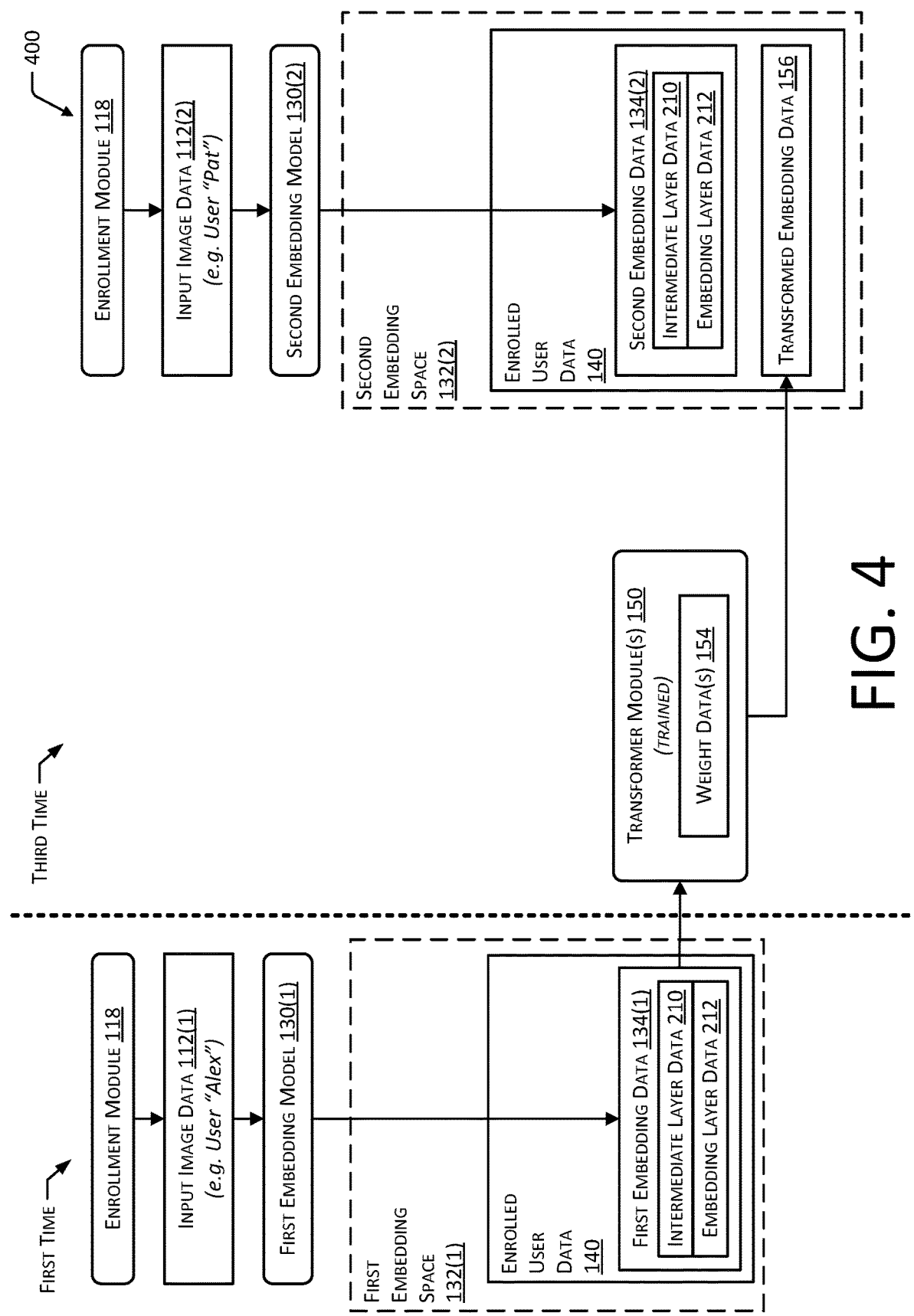
FIG. 4 illustrates a trained transformer module to determine transformed embedding data, according to some implementations.

FIG. 4 illustrates at 400 a trained transformer module 150 used to determine transformed embedding data 156, according to some implementations. The trained transformer module 150 may be implemented by one or more computing devices 106.

As described above, at a first time, the enrollment module 118 is used to acquire input image data 112(1) for a user "Alex". This input image data 112(1) is processed by a first embedding model 130(1) to determine first embedding data 134(1) representative of Alex in a first embedding space 132(1).

In some implementations, the first embedding data 134(1) comprises, or is based on, intermediate layer data 210 and embedding layer data 212. The intermediate layer data 210 may comprise values associated with one or more layers of the first embedding model 130(1) while processing the input image data 112(1). The embedding layer data 212 comprises the embedding data that is provided by output of the first embedding model 130(1). In one implementation, the intermediate layer data 210 may comprise values of a penultimate layer of a neural network of the first embedding model 130(1). The penultimate layer may comprise the layer preceding the final output of the embedding layer data 212. In one implementation, the intermediate layer data 210 may comprise the values of a fully connected linear layer that precedes the output of the embedding layer data 212. The first embedding data 134(1) may comprise a concatenation of the intermediate layer data 210 and the embedding layer data 212. In other implementations, the intermediate layer data 210 and the embedding layer data 212 may be otherwise combined.

At the first time, the enrolled user data 140 comprises the first embedding data 134(1) for Alex and associated identification data 142 (not shown). For example, the enrolled user data 140 may comprise one or more of the embedding layer data 212, intermediate layer data 210, data based on both, and so forth.

At a third time, the recognition embedding network modules 120 have been modified, and the second embedding model 130(2) is now in use. The transformer module 150, trained as described in FIG. 3, is used to convert or transform the first embedding data 134(1) to the transformed embedding data 156, with the transformed embedding data 156 being in the second embedding space 132(2). This transformed embedding data 156 is stored in the enrolled user data 140, along with the associated identification data 142 for Alex.

Also at the third time, a new user "Pat" has decided to enroll in using the system. The enrollment module 118 is used to acquire input image data 112(2) for the user "Pat". This input image data 112(2) is processed using the second embedding model 130(2) to determine second embedding data 134(2) that is representative of Pat. In some implementations, the second embedding data 134(1) may comprise, or is based on, intermediate layer data 210 and embedding layer data 212 during operation of the second embedding model 130(2).

The enrolled user data 140 now comprises embedding data 134 for a consistent embedding space 132, in this example the second embedding space 132(2). In one implementation, the first embedding data 134 may be retained in the enrolled user data 140. In another implementation, the first embedding data 134 may not be retained in the enrolled user data 140.

In some implementations, the trained transformer module(s) 150 may be used to convert embedding data 134 in an offline process. For example, while transitioning from using a first embedding model 130(1) to a second embedding model 130(2), the previously stored first embedding data 134(1) may be processed in a batch with the transformer module 150 to determine the second embedding data 134(2). Such conversion may thus be completed before a query that would utilize the new embedding data 134 is received. This implementation eliminates latency in asserting identity that may result from an online or on-demand conversion process.

In some situations, different embedding models 130 may be in use by the system 100 at the same time. For example, a first version of the scanner 104 that is deployed may use the first embedding model 130(1) to determine first embedding data 134 while a second version of the scanner 104 that is deployed may use the second embedding model 130(2). The system 100 may use the techniques described in this disclosure to support these different versions in determining the asserted identification data 164.

Figure 5A:
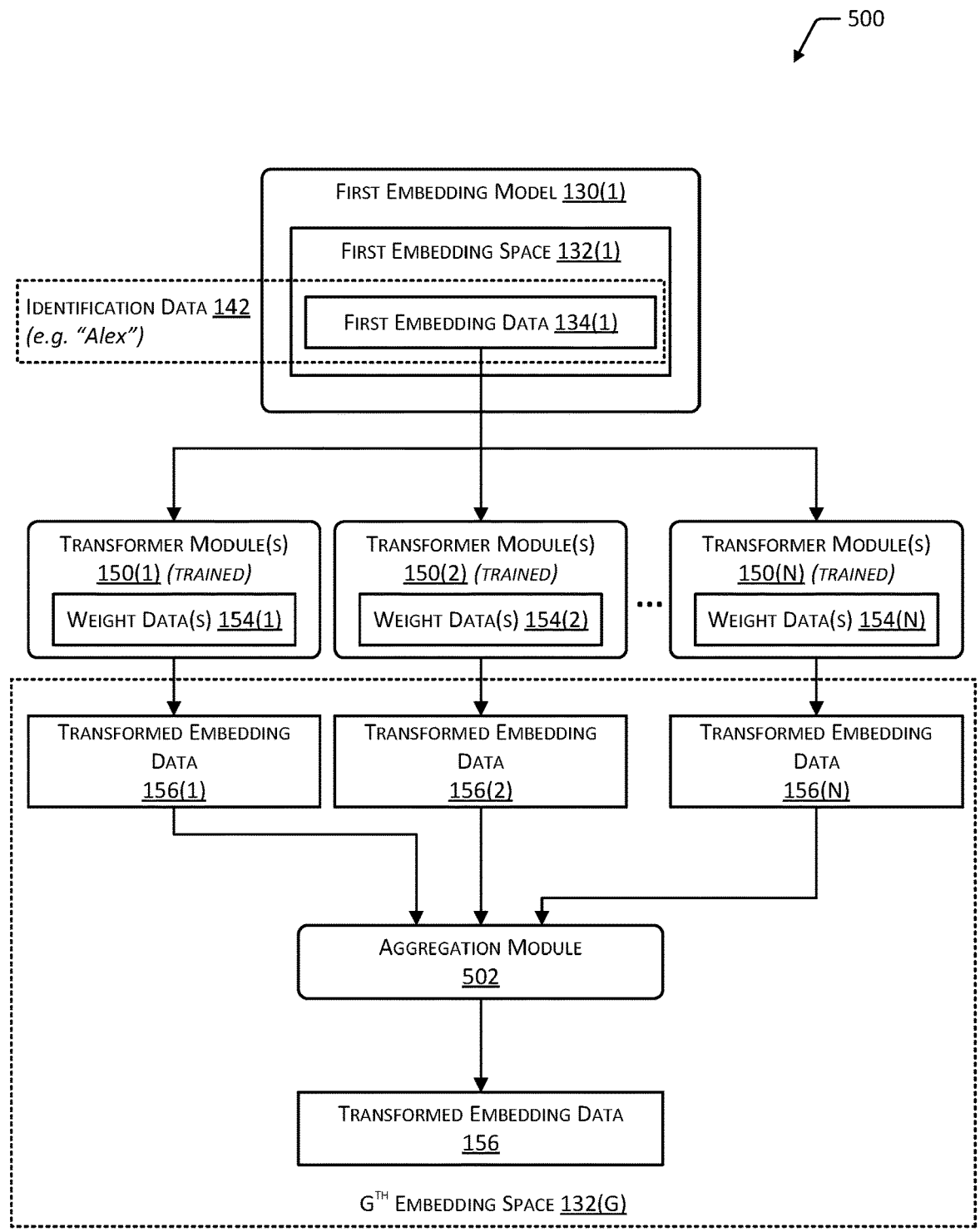
FIG. 5A is a block diagram of aggregating output from a plurality of transformer modules to determine transformed embedding data, according to some implementations.

FIG. 5A is a block diagram 500 of aggregating output from a plurality of transformer modules 150 to determine transformed embedding data 156, according to some implementations. The transformer modules 150 and aggregation may be implemented by one or more computing devices 106.

First embedding data 134(1) is provided as input to a plurality of previously trained transformer modules 150(1), 150(2), . . . , 150(N). As described above, the first embedding data 134(1) is associated with a first embedding space 132(1). The first embedding data 134(1) may comprise, or may be based on, intermediate layer data 210 and embedding layer data 212. The intermediate layer data 210 may comprise values associated with one or more layers of the first embedding model 130(1) while processing input. The embedding layer data 212 comprises the embedding data that is provided by output of the first embedding model 130(1). In one implementation, the intermediate layer data 210 may comprise values of a penultimate layer of a neural network of the first embedding model 130(1). The penultimate layer may comprise the layer preceding the final output of the embedding layer data 212. The first embedding data 134(1) may be associated with a particular identity, such as user "Alex".

Each of the transformer modules 150(1)-(N) may be trained as described above with regard to FIG. 3. In some implementations, each transformer module 150(N) of the plurality may be trained using the same set of transformer training data 152, or different sets of transformer training data 152. Even in the event the same transformer training data 152 is used, differences in initial conditions and other factors will result in different weight data 154 resulting for each of the transformer modules 150(N) in the plurality.

During processing, each of the trained transformer modules 150(1)-(N) accepts as input the first embedding data 134(1) and produces respective transformed embedding data 156(1), 156(2), . . . , 156(N) in a Gth embedding space 132(G). While each transformed embedding data 156 is based on the same first embedding data 134(1), they may differ from one another in their respective values due to the varied weight data 154 for the respective transformer modules 150.

The set of transformed embedding data 156(1), 156(2), . . . , 156(N) may be aggregated by an aggregation module 502 to determine the transformed embedding data 156 in the Gth embedding space 132(G) that may be subsequently stored in the enrolled user data 140. In one implementation, the aggregation module 502 may calculate the transformed embedding data 156 as an average of the vector values of the transformed embedding data 156(1), 156(2), . . . , 156(N). In other implementations, the aggregation module 502 may utilize other functions.

Colloquially, the implementation depicted in FIG. 5A allows each transformer module 150 which has "learned" differently from other transformer modules 150 to contribute to the final transformed embedding data 156.

Figure 5B:
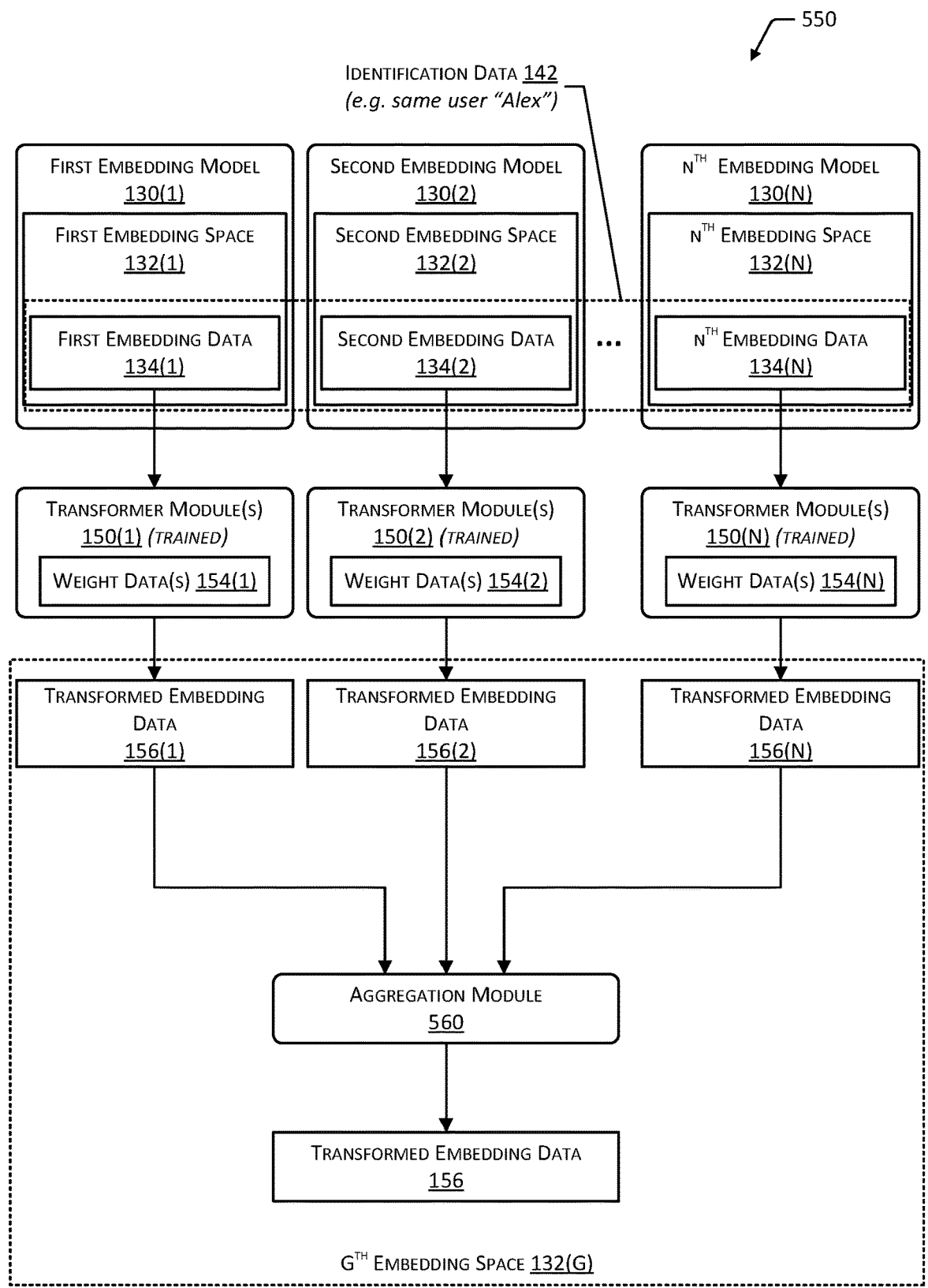
FIG. 5B is a block diagram of aggregating output from a plurality of transformer modules that accept different embedding data as input, to determine transformed embedding data, according to some implementations.

FIG. 5B is a block diagram 550 of aggregating output from a plurality of transformer modules 150 that accept different embedding data 134 as input, to determine transformed embedding data 156, according to some implementations. The transformer modules 150 and aggregation may be implemented by one or more computing devices 106.

The system 100 may utilize different embedding models 130. For example, new embedding models 130 may be added, old embedding models 130 may be deprecated, particular embedding models 130 may be designed for particular use cases, and so forth. The techniques mentioned above may be used to convert or transform the embedding data 134 from one embedding space 132 to another. The embedding data 134 in a plurality of embedding spaces 132 may be retained and used to facilitate further transformations of embedding data 134.

In this illustration, first embedding data 134(1), second embedding data 134(2), and nth embedding data 134(N) are depicted. The first embedding data 134(1), second embedding data 134(2), and nth embedding data 134(N) are all associated with the same identification data 142, such as user Alex.

The embedding data 134(1)-134(N) may comprise, or may be based on, intermediate layer data 210 and embedding layer data 212. The intermediate layer data 210 may comprise values associated with one or more layers of the first embedding model 130(1) while processing input. The embedding layer data 212 comprises the embedding data that is provided by output of the respective embedding models 130. In one implementation, the intermediate layer data 210 may comprise values of a penultimate layer of a neural network of the respective embedding model 130. The penultimate layer may comprise the layer preceding the final output of the embedding layer data 212 of the respective embedding model 130.

The embedding data 134 is provided to a respective transformer module 150 that has been trained to convert input into a Gth embedding space 132(G). For example: first embedding data 134(1) is provided as input to a first transformer module 150(1) that determines transformed embedding data 156(1). Second embedding data 134(2) is provided as input to a second transformer module 150(2) that determines transformed embedding data 156(2). Nth embedding data 134(N) is provided as input to an Nth transformer module 150(1) that determines transformed embedding data 156(N).

An aggregation module 560 aggregates the set of transformed embedding data 156(1)-(N) to determine the transformed embedding data 156 in the Gth embedding space 132(G). In one implementation, the aggregation module 560 calculates the transformed embedding data 156 as an average of the vector values of the transformed embedding data 156(1), 156(2), . . . , 156(N). In other implementations, the aggregation module 560 may utilize other functions.

The transformed embedding data 156 in the Gth embedding space 132(G) determined by the aggregation module 560 that may be subsequently stored in the enrolled user data 140.

Colloquially, this implementation may be considered as though each of the different embeddings for the same identity have contributed some information to the final transformed embedding data 156.

Figure 6:
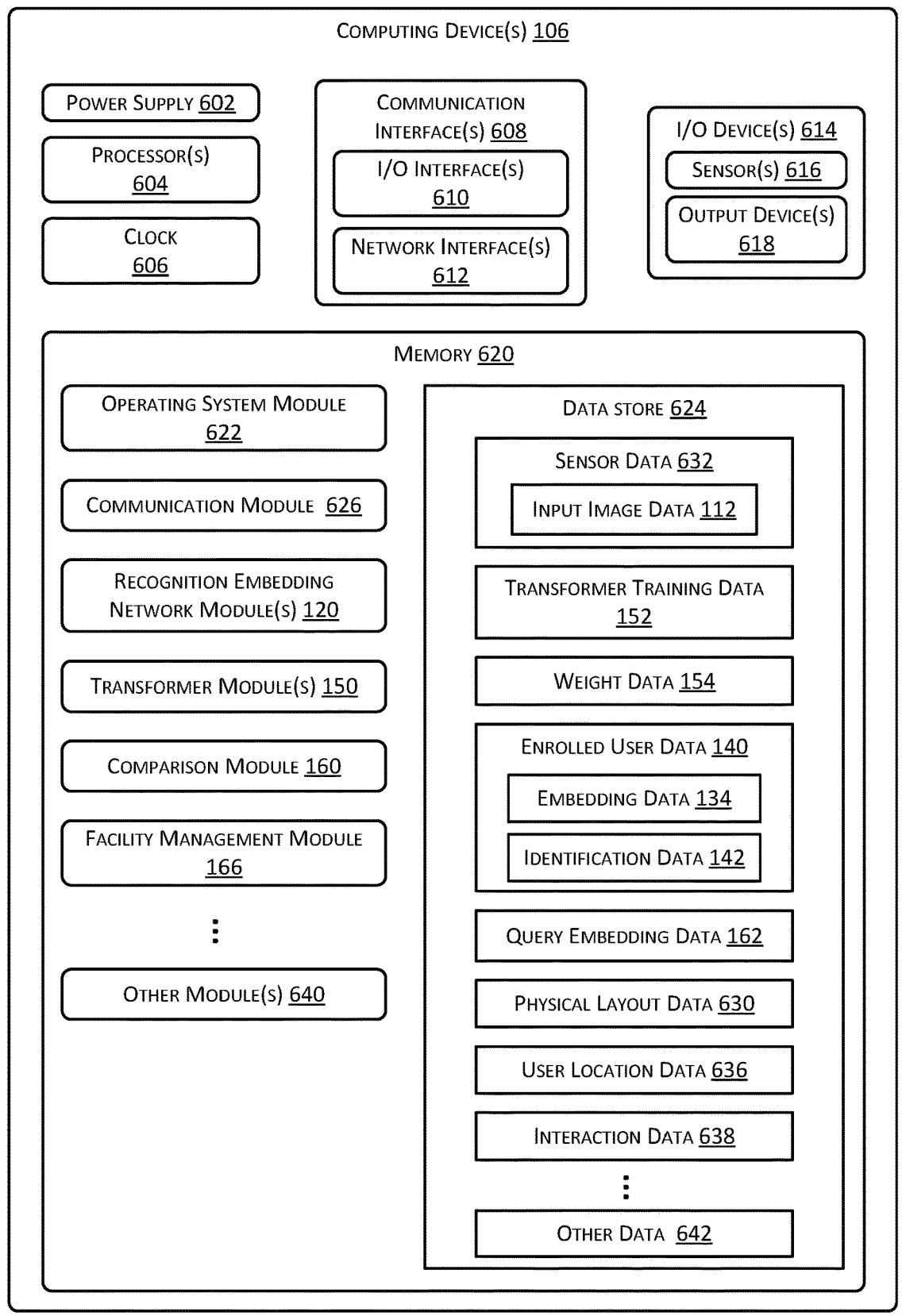
FIG. 6 is a block diagram of a computing device to implement the system, according to some implementations.

FIG. 6 is a block diagram of a computing device 106 to implement the system 100, according to some implementations. The computing device 106 may be within the scanner 104, may comprise a server, and so forth. The computing device 106 may be physically present at the facility, may be accessible by a network, or a combination of both. The computing device 106 does not require end-user knowledge of the physical location and configuration of the system that delivers the services. Common expressions associated with the computing device 106 may include "embedded system", "on-demand computing", "software as a service (SaaS)", "platform computing", "network-accessible platform", "cloud services", "data centers", and so forth. Services provided by the computing device 106 may be distributed across one or more physical or virtual devices.

One or more power supplies 602 may be configured to provide electrical power suitable for operating the components in the computing device 106. The one or more power supplies 602 may comprise batteries, capacitors, fuel cells, photovoltaic cells, wireless power receivers, conductive couplings suitable for attachment to a power source such as provided by an electric utility, and so forth. The computing device 106 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 106 may include one or more communication interfaces 608 such as input/output (I/O) interfaces 610, network interfaces 612, and so forth. The communication interfaces 608 enable the computing device 106, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 106 or may be externally placed. The sensors 616 may comprise the camera 108, smartcard readers, touch sensors, microphones, and so forth.

The network interfaces 612 may be configured to provide communications between the computing device 106 and other devices, such as routers, access points, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, and so forth.

The computing device 106 may also include one or more buses or other internal communications hardware or software that allow for the transfer of data between the various modules and components of the computing device 106.

As shown in FIG. 6, the computing device 106 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 106. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 626 may be configured to establish communications with the computing device 106, servers, other computing devices 106, or other devices. The communications may be authenticated, encrypted, and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including the computing devices 106, network attached storage devices, and so forth.

The data store 624 may store one or more of the transformer training data 152, the trained weight data 154, enrolled user data 140, query embedding data 162, and so forth. The memory 620 may store the recognition embedding network module(s) 120, the transformer module(s) 150, the comparison module 160, the facility management module 166, and so forth.

In some implementations, the input image data 112 may be temporarily stored during processing by the recognition embedding network module 120. For example, the scanner 104 may acquire the input image data 112, determine embedding data 134 based on the input image data 112, and then erase the input image data 112. The resulting embedding data 134 may then be sent to a server or other computing device 106 to perform enrollment, comparison to assert an identity, and so forth.

The facility management module 166 may perform various functions, such as tracking items between different inventory locations, to and from carts, generating restocking orders, directing operation of robots within the facility, using the asserted identification data 164 to associate a particular user identity with a user in the facility, and so forth. During operation, the facility management module 166 may access sensor data 632 such as input image data 112, or data from other sensors.

Information used by the facility management module 166 may be stored in the data store 624. For example, the data store 624 may be used to store physical layout data 630, sensor data 632, asserted identification data 164, user location data 636, interaction data 638, and so forth. For example, the sensor data 632 may comprise the input image data 112 obtained from a scanner 104 associated with the facility.

The physical layout data 630 may provide information indicative of where scanners 104, cameras, weight sensors, antennas for radio receivers, inventory locations, and so forth are in the facility with respect to one another. For example, the physical layout data 630 may comprise information representative of a map or floor plan of the facility with relative positions of gates with scanners 104 and inventory locations.

The facility management module 166 may generate the user location data 636 that is indicative of the location of the user within the facility. For example, the facility management module 166 may use image data obtained by the cameras to determine a location of the user. In other implementations, other techniques may be used for determining the user location data 636. For example, data from a smart floor may be used to determine the location of the user.

The identification data 142 may be associated with user location data 636. For example, the user enters the facility and has their hand 102 scanned by the scanner 104, resulting in asserted identification data 164 that is associated with their time of entry and the scanner 104 location. The user location data 636 indicative of a path of a user that begins at the scanner 104 location at the time of entry may be associated with the user identifier in the asserted identification data 164.

Based on the user location data 636 and the interaction data 638, a particular interaction may be associated with an account of a particular user. For example, if the user location data 636 indicates that the user is present in front of inventory location 692 at time 09:02:02 and the interaction data 638 indicates a pick of a quantity of one item from an area on inventory location 692 at 09:04:13, the user may be billed for that pick.

The facility management module 166 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 166 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 166 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the asserted identification data 164 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 164. In another example, a robot may incorporate a scanner 104. The robot may use the asserted identification data 164 to determine whether to deliver a parcel to the user, and based on the asserted identification data 164, which parcel to deliver.

While the input to the system 100 is discussed with respect to image data, the system may be used with other types of input. For example, the input may comprise data acquired from one or more sensors, data generated by another system, and so forth. For example, instead of image data produced by the camera 108, the input to the system 100 may comprise an array of data. Other modalities may also be used. For example, the first modality may be visible light, the second modality may be sonar, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    one or more memories, storing first computer-executable instructions; and
    one or more hardware processors to execute the first computer-executable instructions to:
    at a first time:
        retrieve an input image from the one or more memories;
        generate, using a first embedding model and the input image, first embedding data within a first embedding space;
        store the first embedding data in the one or more memories; and
        remove the input image from the one or more memories;
    at a second time:
        determine a second embedding model, wherein the second embedding model generates second embedding data within a second embedding space, wherein the second embedding space is different from the first embedding space;
        determine training input data comprising:
            a plurality of images, wherein each image of the plurality of images is associated with a sample identifier that indicates a training identity associated with the each image;
        determine transformer training data comprising:
            the sample identifier associated with the each image;
            first training embedding data using the first embedding model and based on the each image, wherein the first training embedding data is associated with the first embedding space; and
            second training embedding data using the second embedding model and based on the each image, wherein the second training embedding data is associated with the second embedding space;
        determine first transformed embedding data using a transformer network and based on the first training embedding data;
        determine a first classification loss based on the first transformed embedding data;
        determine a second classification loss based on the second training embedding data;
        determine a similarity loss based on the first transformed embedding data and the second training embedding data;
        determine a divergence loss based on the first classification loss and the second classification loss; and
        train the transformer network based on the first classification loss, the second classification loss, the similarity loss, and the divergence loss; and
    at a third time:
        retrieve the first embedding data from the one or more memories;
        transform, using the transformer network, the first embedding data into second transformed embedding data in the second embedding space;
        retrieve query embedding data in the second embedding space; and
        compare the query embedding data with the second transformed embedding data.

2. The system of claim 1, wherein the first training embedding data comprises intermediate layer data of the first embedding model and embedding layer data of the first embedding model.

3. The system of claim 1, wherein the training input data excludes enrolled users of a biometric identification system.

4. A method comprising:
    at a first time:
        retrieving input image data from one or more memories;
        generating, using a first embedding model and the input image data, first embedding data within a first embedding space;
        storing the first embedding data in the one or more memories; and
        removing the input image data from the one or more memories;
    at a second time:
        determining a second embedding model, wherein the second embedding model generates second embedding data within a second embedding space, wherein the second embedding space is different from the first embedding space;

determining training input data comprising:
  a plurality of images, wherein each image of the plurality of images is associated with a sample identifier that indicates a training identity associated with the each image;
determining transformer training data comprising:
  the sample identifier associated with the each image;
  first training embedding data using the first embedding model and based on the each image, wherein the first training embedding data is associated with the first embedding space; and
  second training embedding data using the second embedding model and based on the each image, wherein the second training embedding data is associated with the second embedding space;
determining first transformed embedding data using a transformer network and based on the first training embedding data;
determining a first classification loss based on the first transformed embedding data;
determining a second classification loss based on the second training embedding data;
determining a similarity loss based on the first transformed embedding data and the second training embedding data:
determining a divergence loss based on the first classification loss and the second classification loss; and
training the transformer network based on the first classification loss, the second classification loss, the similarity loss, and the divergence loss; and
at a third time:
  retrieving the first embedding data from the one or more memories;
  transforming the first embedding data into the second embedding space using the transformer network;
  retrieving query embedding data in the second embedding space; and
  comparing the query embedding data with second transformed embedding data.

5. The method of claim 4, the first training embedding data comprising a concatenation of intermediate layer data of the first embedding model and embedding layer data of the first embedding model.

6. The method of claim 4, wherein the transformer training data excludes embedding data associated with enrolled users of a biometric identification system.

7. The method of claim 4, further comprising:
generating the each image using a generative adversarial network.

8. The method of claim 4, wherein:
the first classification loss is determined using a hyperspherical loss function; and
the second classification loss is determined using the hyperspherical loss function.

9. The method of claim 4 wherein:
the similarity loss is determined using a mean squared error and cosine distance loss function.

10. The method of claim 4, wherein:
the divergence loss is determined using a Kullback-Leibler divergence function.

11. The method of claim 4, further comprising:
accessing a first set of enrolled user data, wherein the first set of enrolled user data comprises embeddings and intermediate layer data associated with the first embedding space; and
determining, using the transformer network and the first set of enrolled user data, a second set of enrolled user data wherein the second set of enrolled user data comprises embeddings associated with the second embedding space.

12. The method of claim 11, further comprising:
determining query input image data;
determining, using the second embedding model and the query input image data, the query embedding data, wherein the query embedding data is associated with the second embedding space; and
determining, based on the query embedding data and the second set of enrolled user data, first identification data.

13. The method of claim 4, further comprising:
accessing first enrolled user data, wherein the first enrolled user data comprises an embedding associated with the first embedding space;
determining, using a plurality of transformer networks and the first enrolled user data, a first set of transformed embedding data; and
determining, based on the first set of transformed embedding data, second enrolled user data wherein the second enrolled user data is associated with the second embedding space.

14. The method of claim 4, further comprising:
accessing first enrolled user data associated with a first user, wherein the first enrolled user data comprises an embedding associated with the first embedding space;
determining, using a first transformer network and the first enrolled user data, third transformed embedding data;
accessing second enrolled user data associated with the first user, wherein the second enrolled user data comprises an embedding associated with a third embedding space;
determining, using a second transformer network and the second enrolled user data, fourth transformed embedding data, wherein the second enrolled user data comprises an embedding associated with the second embedding space; and
determining, based at least on the third transformed embedding data and the fourth transformed embedding data, fifth transformed embedding data.

15. A system comprising:
one or more memories, storing first computer-executable instructions; and
one or more hardware processors to execute the first computer-executable instructions to:
  retrieve input image data from the one or more memories;
  generate, using a first embedding model and the input image data, first embedding data within a first embedding space;
  store the first embedding data in the one or more memories;
  remove the input image data from the one or more memories;
  determine a second embedding model, wherein the second embedding model generates second embedding data within a second embedding space;
  access input data;
  determine first training embedding data using the first embedding model and the input data;
  determine second training embedding data using the second embedding model and the input data;
  determine training data comprising:
    the first training embedding data; and
    the second training embedding data;

train a first network, using the training data, to accept an input associated with the first embedding space of the first embedding model and generate an output associated with the second embedding space of the second embedding model;

retrieve the first embedding data from the one or more memories; and transform the first embedding data into the second embedding space using the first network.

16. The system of claim 15, the instructions to train the first network further comprising instructions to:

determine transformed embedding data using the first network and based on the training data;

determine a first classification loss based on the transformed embedding data;

determine a second classification loss based on the second training embedding data;

determine a similarity loss based on the transformed embedding data and the second training embedding data;

determine a divergence loss based on the first classification loss and the second classification loss; and train the first network based on the first classification loss, the second classification loss, the similarity loss, and the divergence loss.

17. The system of claim 15, further comprising instructions to:

access first enrolled user data, wherein the first enrolled user data comprises an embedding associated with the first embedding space;

determine, using a plurality of first networks and the first enrolled user data, a first set of transformed embedding data; and determine, based on the first set of transformed embedding data, second enrolled user data wherein the second enrolled user data is associated with the second embedding space.

18. The system of claim 15, further comprising instructions to:

access first enrolled user data associated with a first user, wherein the first enrolled user data comprises an embedding associated with the first embedding space;

determine, using the first network and the first enrolled user data, first transformed embedding data;

access second enrolled user data associated with the first user, wherein the second enrolled user data comprises an embedding associated with a third embedding space;

determine, using a second network and the second enrolled user data, second transformed embedding data, wherein the second enrolled user data comprises an embedding associated with the second embedding space; and determine, based on the first transformed embedding data and the second transformed embedding data, third transformed embedding data.

* * * * *